(12) United States Patent
Socol et al.

(10) Patent No.: US 9,628,149 B2
(45) Date of Patent: Apr. 18, 2017

(54) EMULATION OF MULTIPLE NFC DEVICES INSIDE A COMMUNICATION DEVICE

(71) Applicant: Optis Circuit Technology, LLC, Plano, TX (US)

(72) Inventors: Constantin Socol, Singapore (SG); Frederic Goffin, Singapore (SG); Guillaume Jaunet, Grasse (FR); Amit Jhawar, Sembawang Close (SG)

(73) Assignee: Optis Circuit Technology, LLC, Plano, TX (US)

( * ) Notice: Subject to any disclaimer, the term of this patent is extended or adjusted under 35 U.S.C. 154(b) by 0 days.

(21) Appl. No.: 14/405,822

(22) PCT Filed: Jun. 24, 2013

(86) PCT No.: PCT/EP2013/063127
§ 371 (c)(1),
(2) Date: Dec. 5, 2014

(87) PCT Pub. No.: WO2014/001251
PCT Pub. Date: Jan. 3, 2014

(65) Prior Publication Data
US 2015/0126111 A1 May 7, 2015

Related U.S. Application Data

(60) Provisional application No. 61/672,342, filed on Jul. 17, 2012.

(30) Foreign Application Priority Data

Jun. 28, 2012 (EP) .................................... 12305764

(51) Int. Cl.
*H04B 5/00* (2006.01)
*G06K 19/07* (2006.01)
*H04W 74/06* (2009.01)

(52) U.S. Cl.
CPC ....... *H04B 5/0056* (2013.01); *G06K 19/0723* (2013.01); *G06K 19/0725* (2013.01); *H04B 5/0031* (2013.01); *H04W 74/06* (2013.01)

(58) Field of Classification Search
CPC .... H04W 4/008; H04W 74/06; H04W 76/025
(Continued)

(56) References Cited

U.S. PATENT DOCUMENTS

| | | | |
|---|---|---|---|
| 2009/0184826 A1* | 7/2009 | Kim | 340/572.4 |
| 2010/0227553 A1* | 9/2010 | Charrat | G06Q 20/341 |
| | | | 455/41.1 |
| 2012/0028579 A1* | 2/2012 | Fine | H04L 29/12254 |
| | | | 455/41.1 |

FOREIGN PATENT DOCUMENTS

| | | |
|---|---|---|
| WO | 2007/077471 A1 | 7/2007 |
| WO | 2012/065643 A1 | 5/2012 |

OTHER PUBLICATIONS

International Search Report issued in corresponding International application No. PCT/EP2013/063127, date of mailing Aug. 1, 2013.
(Continued)

*Primary Examiner* — Nay A Maung
*Assistant Examiner* — Angelica M Perez
(74) *Attorney, Agent, or Firm* — Spencer C. Patterson; Grable Martin Fulton PLLC

(57) ABSTRACT

Communication device (T1) comprising—An antenna (A1) and physical circuitry (PHY) for receiving a poll command (PC) from a second communication device (T2).—A plurality of entities (D1, D2, D3 . . . Dn) emulating NFC devices,—An arrangement for deciding, for each entity of said plurality of entities, if a response should be sent and if so sending a response (LF1, LF2, LF3 . . . LFn) to said second communication device (T2), containing information related to the respective NFC device.

18 Claims, 3 Drawing Sheets

(58) Field of Classification Search
USPC ......... 455/41.1, 41.2–41.3, 558; 375/211.05, 375/433.09; 902/26
See application file for complete search history.

(56) References Cited

OTHER PUBLICATIONS

Written Opinion of the International Searching Authority issued in corresponding International application No. PCT/EP2013/063127, date of mailing Aug. 1, 2013.
Extended European Search Report issued in corresponding European application No. EP 12 30 5764, date of completion of the search Nov. 19, 2012.

* cited by examiner

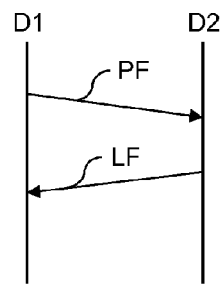
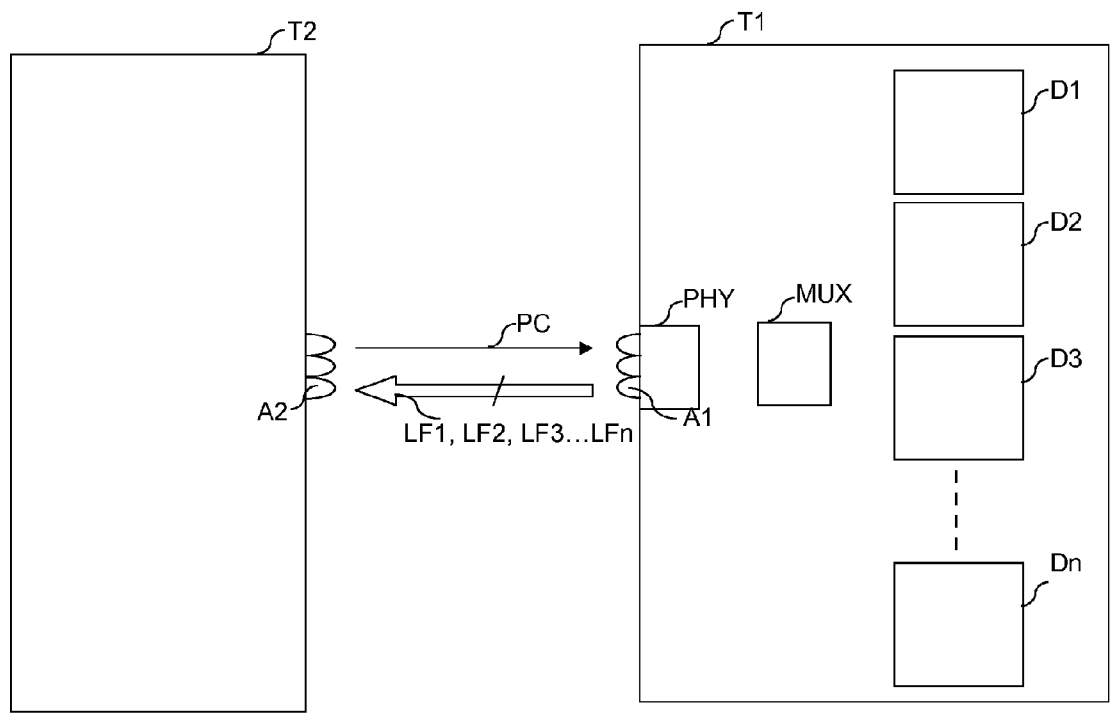

EMULATION OF MULTIPLE NFC DEVICES INSIDE A COMMUNICATION DEVICE

FIELD OF THE INVENTION

The invention relates to the field of near-field communications and more particularly to devices compliant to ISO 18092, ECMA 340 or NFC Forum NFC-F category of devices.

BACKGROUND OF THE INVENTION

Near-field communication (NFC) is a short-range wireless communication technology for exchanging data between devices over distances of centimeters to tens of centimeters, generally up to 10 cm. One example application for NFC is radio-frequency identification (RFID) where a reader device can detect and retrieve data from a tag equipped with an antenna.

Generally, a first device enters a polling mode where it generates an electromagnetic field in order to poll for other available NFC devices in the vicinity. These close NFC devices should answer to let the first device know about them. In some cases, the close devices answer by only modulating the carrier electromagnetic field, the modulation data forming a signal which can be demodulated by the first device.

On this principle, the ISO (International Standards Organization) and the NFC-Forum have defined more refined protocols and mechanisms enabling devices of various manufacturers to interoperate. More precisely, the standards define several technologies to cover different manufactures and legacy technologies, namely the NFC-A, NFC-B and NFC-F technologies. Each technology is associated with a group of transmission parameters defining a complete communication protocol, like, for instance: bit rate, modulation scheme, bit level coding, frame format etc. However, all the technologies share a few core parameters enabling a basic interoperating, e.g. the same radio-frequency for the carrier electromagnetic field (13.56 MHz), same protocol, and same command set.

The FIG. 1 shows a basic protocol exchange between two devices according to the NFC-F technology.

A first device D1 is in a so-called "poll mode" which can be considered as the initial mode for a device trying to discover its neighborhood by generating a carrier field. It sends a poll frame PF, which can be received by NFC-complaint devices in the vicinity.

A device D2 is in listen mode. This listen mode can be considered as another initial mode for a NFC device, wherein it does not generate any carrier field but is continuously listening for the electromagnetic carrier field generated by another device. When it detects the field generated by the device D1 and receives the poll frame PF, it answers with a Listen Frame LF so as this frame can be perceived by the device D1.

This Listen Frame enables the device D2 to let the first device D1 know about its presence and which mode of communication is possible.

There are two modes of Near-Field Communication:
a passive communication mode where the device D2 (i.e. the one which has not already generated a carrier field) will send messages by using the carrier field of D1 only.
An active communication mode, where the device D2 can generate its own carrier field to send its messages. In such a mode (also called "peer-to-peer mode") both devices alternatively generate a carrier field to communicate.

The passive communication mode is used when the receiving device D2 is a tag, e.g. a Type 3 Tag (T3T) according to the NFC Forum Digital Protocol specification.

The active communication mode can be used when the receiving device D2 is a more complex device, having means to generate its own carrier field, and generally means to embed software applications. Such devices can be mobile phones, like smartphones, tablets, laptop computers, etc.

Such device D2 may also emulate a simple tag and therefore interoperate with the first device D1 in a passive communication mode.

There is a need for taking into consideration the situation of advanced communication devices which can emulate NFC devices. In particular, there is a need to propose solutions, especially an architecture, for a communication device to emulate several NFC devices and to let other parties know about these emulated devices.

SUMMARY OF THE INVENTION

An object of embodiments of the present invention is to propose such a solution.

This is achieved with a method for a first communication device in listen mode to answer to a poll command sent by a second communication device; this first communication device emulating a plurality of NFC devices and this method comprising steps of:
Receiving the poll command by the first communication device;
For each of the plurality of NFC devices, deciding if a response should be sent and if so, sending a response to the second communication device, containing information related to the respective NFC device.

According to embodiments of the invention, the method can comprise one or several of the following features:
The steps of deciding and sending a response may be performed by each of the plurality of NFC devices;
The poll command may be forwarded to each of the plurality of NFC devices;
The steps of deciding and sending a response may be performed by an answering arrangement without forwarding the poll command to the NFC devices;
The response may be elaborated when triggered by an interrupt received from a timer;
The information may contain a NFCID2 identifier;
The information may contain an indication about whether the respective NFC device is a Type 3 tag or a peer-to-peer device based NFC-DEP protocol.

The invention has for other object a communication device comprising:
An antenna and physical circuitry (PHY) for receiving a poll command (PC) from a second communication device (T2).
A plurality of entities (D1, D2, D3 ... Dn) emulating NFC devices,
An arrangement for deciding, for each entity of said plurality of entities, if a response should be sent and if so sending a response (LF1, LF2, LF3 ... LFn) to said second communication device (T2), containing information related to the respective NFC device.

According to embodiments of the invention, the communication device can comprise one or several of the following features:

Each of the entities comprises answering arrangements adapted to elaborate and send a response related to the respective emulated NFC device;

The communication device further may comprise an answering arrangement adapted to elaborate and send responses related to at least two emulated devices;

This answering arrangement may comprise a timer for generating interrupts according to NFC time rules, and a software layer for elaborating the responses when triggered by the interrupts;

The information may contain a NFCID2 identifier;

The information may contain an indication about whether the respective NFC device is a Type 3 tag or a peer-to-peer device based NFC-DEP protocol.

The invention also relates to a computer program product comprising a computer readable medium, having thereon a computer program comprising program instructions, the computer program being loadable into a data-processing unit and adapted to cause execution of the method as described above, when the computer program is run by the data-processing unit.

Another object of the invention is a system comprising a communication device according as described above and the second communication device.

Further features and advantages of embodiments of the invention will appear from the following description of some embodiments of the invention, given as non-limiting examples, with reference to the accompanying drawings listed hereunder.

BRIEF DESCRIPTION OF THE DRAWINGS

FIG. 1 shows a basic protocol exchange between two devices according to the NFC-F technology.

FIG. 2 shows a block diagram illustrating an exemplary configuration of the communication devices T1, T2 in accordance with an embodiment of the invention, one in Poll mode, the other in Listen mode;

DETAILED DESCRIPTION OF EMBODIMENTS OF THE INVENTION

The invention relates to the NFC-F technology. This subset of the NFC-Forum specifications is normalized by the ISO/IEC 18092 standard, entitled "Near Field Communication Interface and Protocol (NFCIP-1), as well as by the NFC-Forum Technical Specification named "NFC Digital Protocol" in the section 6.

In the example depicted by FIG. 2, the device T2 in Poll mode is considered as "initiator": it means that it generates a carried electro-magnetic field and sends a poll command PC in order to know about other NFC-compliant devices in the vicinity. This initiator device T2 is supposed in poll mode.

Figure 3:
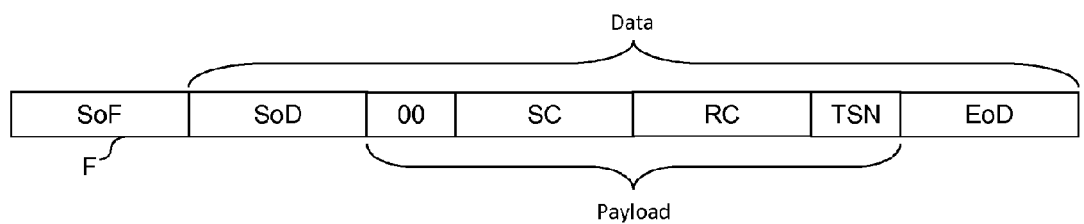
FIG. 3 illustrates a data frame for a poll command, according to an embodiment of the invention.

This poll command PC (also named polling request) is transmitted within a data frame as depicted in FIG. 3.

A frame F starts with a SoF (Start of Frame) field, followed by a data field (labeled "data" in picture 3). The SoF field is typically set at a value "B24D" in hexadecimal.

The data field consists in a SoD (Start of Data) field, a payload and an EoD (End of Data) field.

The SoD field contains a length byte indicating the length of the payload+1. The EoD field contains a two-byte checksum calculated on the payload and SoD fields.

The payload contains the poll command per se, which is named "SENSF_REQ". In general, this command is use by any NFC Forum Device in Poll Mode to probe the Operating Field for NFC Forum devices in Listen mode.

The SC field (System Code) contains information regarding the NFC forum device to be polled for (e.g. the Technology subset). If the initiator device D1 wishes to poll for any NFC device, the SC field should be set to "FFFF" (hexadecimal value).

The RC field (Request Code) can be used to retrieve additional information in the expected SENSF_RES response(s).

The TSN field (Time Slot Number) is used for collision resolution and to reduce the probability of collisions. The anti-collision scheme is based on the definition of time slots in which NFC devices in Listen mode are invited to respond.

The device D1 in Poll mode sends a SENSF_REQ command with a TSN value indicating the number of time slots available.

A communication device T1 is in Listen mode. It means that it is waiting for a poll command, which will trigger a reaction from it.

It is supposed in this example that the communication devices T1 and T2 are in vicinity, such that their respective antennas A1, A2 are coupled by an electro-magnetic field. They can then communicate data frames as is known in the art and specified by the NFC forum, ISO and other standardization bodies.

The communication device T1 comprises an antenna A1 and physical circuitry PHY adapted for receiving commands and notably the poll command sent by the communication device T2 in poll mode.

The communication device T2 also comprises a plurality of entities D1, D2, D3 . . . Dn, each emulating a NFC device. As it will be seen later, these entities can be of different nature: they can comprise hardware elements and software elements. The entities can be independent devices that are, somehow, plugged into the communication device T2, or pieces of a hardware platform emulating the devices, or software programs emulating the devices in a software way. Other embodiments are possible as well as a combination of these embodiments.

The number of emulated devices is limited to 16 per the technology F specifications of the NFC forum. If more than 16 devices are emulated, only 16 at a time can be handled.

According to one aspect of the invention, it can be possible to emulate a collision in certain slots. This collision provides information to the communication device in Poll mode that there are more emulated devices to resolve. Then, it can restart a process to discover them. This additional feature enables the communication device to get rid of the limit specified by the NFC Forum and emulate any number of NFC devices.

These devices can be of the different possible types, according to the NFC forum specifications. More precisely, the emulated devices can be:

Type 3 Tag (T3T)

Peer-to-peer devices based on NFC-DEP protocol.

A T3T device acts like a tag which can only handle a passive communication mode with the communication device T2.

A peer-to-peer device based on NFC-DEP protocol acts by establishing a passive communication mode with the communication device T2. It means they both conform to a half-duplex transmission protocol, so as they alternatively switch to receiver and emitter role. Only one device sends data at a time.

Several half-duplex transmission protocols exist. The NFC Forum however specifies the NFC-DEP protocol for the devices conforming to Type F Technology. This NFC-DEP protocol is described in the section 14 of the NFC Digital Protocol document (version 1.0, dated Nov. 17, 2010).

The communication device T1 also comprises an arrangement for determining, for each of the entity D1, D2, D3 . . . Dn, if an answer should be sent.

This decision is based on the SC field of the poll command PC.

If the SC field indicates than all the devices are polled, then an answer should be sent for every entity embedded inside the communication device T1.

If the SC field indicates that a specific technology subset is polled, then a decision is taken for each entity, consisting in elaborating a response for a certain entity only if the emulated device is of the subset corresponding to this SC field. Otherwise, the entity associated to the emulated device should not answer.

This behavior is conforming to the NFC forum specifications.

When a decision has been taken for a device, the response is elaborated and sent. A different response LF1, LF2, LF3 . . . LFn is sent for each entity D1, D2, D3 . . . Dn (respectively) for which it has been decided that a response should be sent.

Figure 4:
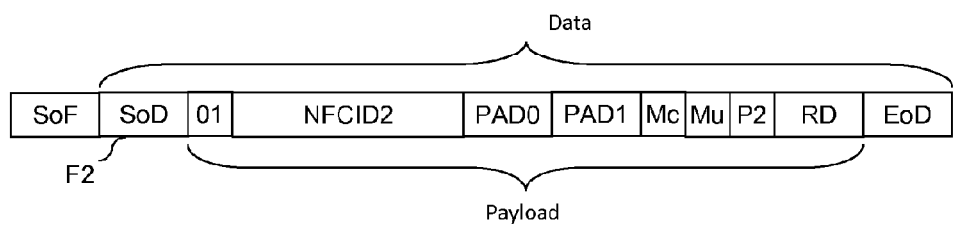
FIG. 4 illustrates a data frame for a response, according to an embodiment of the invention.

This response is transmitted within a data frame as depicted in FIG. 4.

A frame F2 stars with a SoF (Start of Frame) field, followed by a data field (labeled "data" in picture 4). The SoF field is typically set at a value "B24D" in hexadecimal.

The data field consists in a SoD (Start of Data) field, a payload and an EoD (End of Data) field.

The SoD field contains a length byte indicating the length of the payload+1. The EoD field contains a two-byte checksum calculated on the payload and SoD fields.

The payload contains the answer per se, which is named SENSF_RES.

The NFCID2 field contains an identifier of the answering device compliant with the NFC Forum. The first byte of this field contains an indicator of the type of device:

Byte 1="01", if the type is NFC-DEP.
Byte 1="02", if the type is T3T

The second byte is generally set to value "FE", and the other bytes are randomly generated by the device.

The RD field (Request Data) is present only if requested in the RC field of the SENSF_REQ command. The format depends on the NFC-F Technology subset for which the answering device is configured.

The other fields are not relevant in the context of the invention, and will not be described here. For further explanations, the section 6.6.2 of the "NFC Digital Protocol technical specification" can be consulted.

The reference Mc stands for "MRTI$_{CHECK}$". The reference Mu stands for "MRTI$_{UPDATE}$". The reference P2 stands for "PAD2"

For each device D1, D2, D3 . . . Dn, if needed, a corresponding response LF1, LF2, LF3 . . . LFn is elaborated. More concretely, it means that an identifier NFCID2 is determined, with the first byte set to the value corresponding to the type and technology subset of the emulated device.

Figure 6:
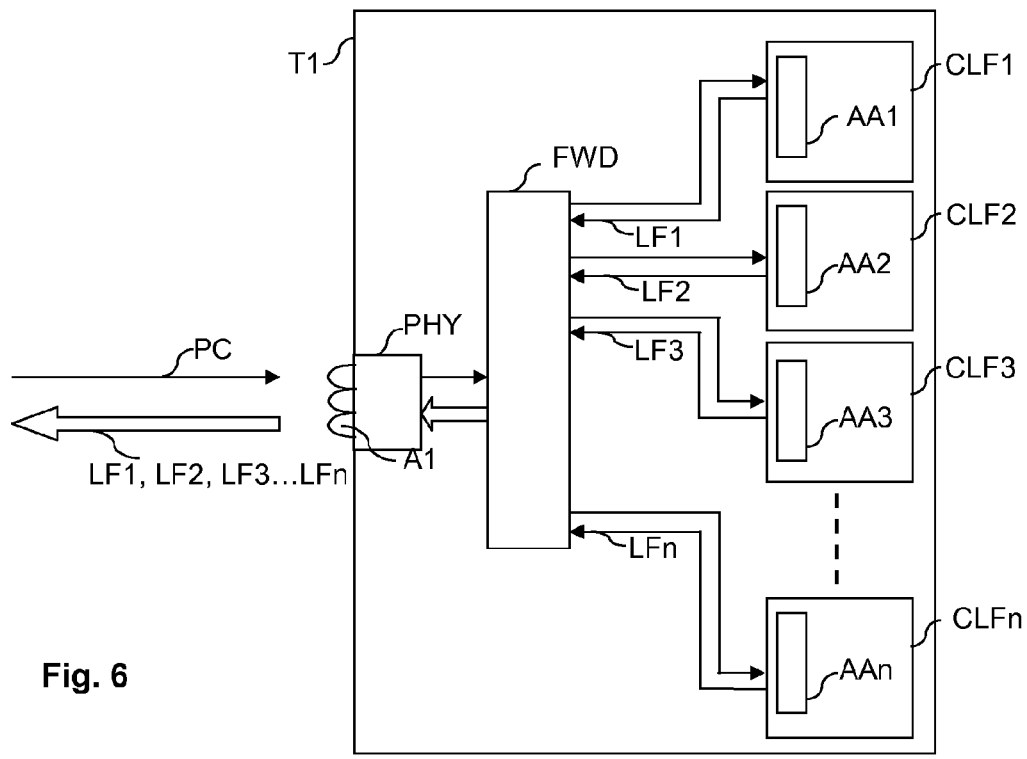
FIGS. 6 and 7 show more detailed block diagrams illustrating two embodiments of the communication device of the invention.

The FIG. 6 shows an embodiment where each device is emulated by a separate entity. These entities can comprise hardware circuits as well as embedded software modules, as if they were independent devices. In a particular implementation, each of these devices may be a separated card or chip.

They can comprise a ContactLess Front-end (CLF), i.e. a combination of hardware and software elements adapted to make the device interoperate with the communication network. The CLF is the interface between the applicative layers of the device and this communication On FIG. 6, only the contactless front-end CLF1, CLF2, CLF3 . . . CLFn have been depicted for each device. The applicative layers and other elements have been omitted since not directly connected with the principle of the invention.

Each contactless front-end comprises answering arrangements AA1, AA2, AA3 . . . AAn in charge of receiving poll commands PC, elaborating a response and sending it.

The response LF1, LF2, LF3 . . . LFn is elaborated according to the data for the respective device as explained above. For instance, each answering arrangement determines its own identifier NFCID2 and inserts it in the outgoing response. Further, the answering arrangements insert data indicating whether the emulated device is a Type 3 tag (T3T) or a peer-to-peer device based on NFC-DEP protocol. The responses are SENSF_RES messages.

The communication device T1 comprises also a forwarder FWD. This arrangement is adapted to receive the commands, e.g. the poll command PC, from the physical circuitry PHY and to forward it to the plurality of contactless front-end CLF1, CLF2, CLF3 . . . CLFn.

Then, it receives the responses LF1, LF2, LF3 . . . LFn from the contactless front-end CLF1, CLF2, CLF3 . . . CLFn and forwards them to the physical circuitry PHY so that they are emitted by the antenna A1 towards the other communication device(s).

The contactless front-ends are in charge of sending the respective responses according to the timing rules specified by the NFC forum.

According to NFC Forum "Digital Protocol" specification, collisions are possible and cannot be handled when occurring. The communication device in Poll mode is then able to "discover" devices that responded in slots where collisions did not occur. Each device determines a slot in which to answer by a random choice.

The communication device in Poll mode can send another poll command in order to discover the devices which answer where previously in collision. By iterating this process, all devices can be discovered.

According to one aspect of the invention, the forwarder FWD can determine situations of internal collision between the responses of the emulated devices. In such cases, it can reset the randomly chosen slots by devices and trigger a next iteration for generating another random slot number.

Figure 7:
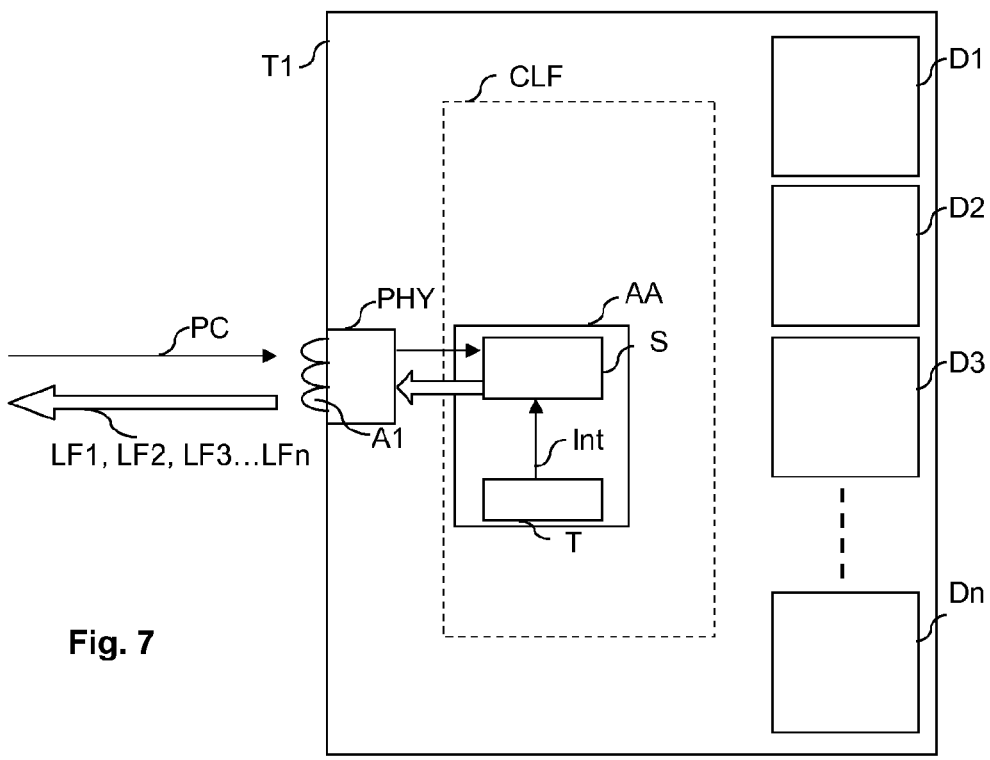

The FIG. 7 illustrates another embodiment of the invention, where a single contactless front-end CLF is in charge of all the devices emulated by the entities D1, D2, D3 . . . Dn.

This CLF comprises an answering arrangement AA adapted to elaborate and send responses SENSF_RES related to the emulated devices. The answering arrangement AA is therefore knowledgeable about the characteristics of the emulated devices. It notably knows whether each device is a T3T device or a peer-to-peer device based on NFC-DEP protocol. It can also generate for each device an identifier NFCID2.

The responses LF1, LF2, LF3 . . . LFn are sent to the physical circuitry PHY and to the antenna A1 according to the time rules specified by the NFC Forum.

According to an embodiment of the invention, the answering arrangement AA comprises a software layer S and a timer T. The software layer S can be responsible of the elaboration and of the sending of the responses.

The timer T can be a hardware layer, in charge of generating interrupts INT according to the time rules of the NFC forum.

Figure 5:
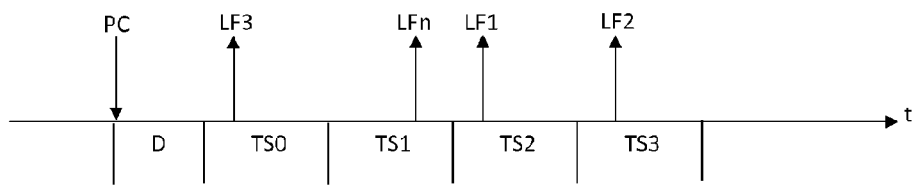
FIG. 5 is a time diagram depicting a possible scheduling of the responses, according to an embodiment of the invention.

The FIG. 5 makes these rules clearer. It illustrates a chronogram where the time t is represented by the arrow going from left to right. The arrival of the poll command PC starts the scheduling. After a delay D, the time is divided into time slots TS0, TS1, TS2, TS3 . . . The number of time slots depends on the data contained in the poll command PC, i.e. the maximum number of devices to be polled.

The timer T can send an interrupt INT for each time slots, especially at the beginning at each time slots.

When receiving such an interrupt INT, the software layer S can elaborate a response, by filling a buffer with data to be transmitted. The actual sending of the data on the RF interface can be triggered and done by the hardware layer. The software layer S can insert an indicator byte to indicate to the hardware layer that the data are ready for transmission.

Only one response is sent during each time slot. In the example depicted in FIG. 5, the response LF3 is sent during the time slot TS0, the response LFn is sent during the time slot TS1, the response LF1 is sent during the time slot TS2 and the response LF2 is sent during the time slot TS3. The sequence goes on when more than 4 time slots are available.

The responses LF1, LF2, LF3 . . . LFn are sent in sequence and can be received by the other communication device without any collision problems.

In order to ensure that sending a SENSF RES occurs in a certain time-slot, it is necessary to have a good software latency control with, preferably, the hardware assistance of the timer T for generating the interrupts on the start of each time slots. However other implementations are possible, including pure software solutions.

The other communication device T2 that receives the responses LF1, LF2, LF3 . . . LFn can then behave as if it has received responses from several devices. From its particular point of view, there is no difference (at this step of discovery) between receiving n SENSF_RES responses from a communication device emulating n devices, or receiving n SENSF_RES responses emitted by n independent devices.

Therefore, a communication device T1 can emulate multiple NFC devices in a transparent way to other parties and compliantly with the NFC Forum specifications.

The invention has been described with reference to preferred embodiments. However, many variations are possible within the scope of the invention.

For instance, it is possible to combine the two embodiments described above, but have both independent contactless front-end comprising their own answering arrangement in charge of elaborating and sending SENSF-RES responses for a first group of devices, and a shared answering arrangement elaborating and sending SENSF_RES responses on behalf of devices of a second group.

The invention claimed is:

1. A method for a first communication device in listen mode to answer to a poll command sent by a second communication device, said first communication device emulating a plurality of NFC devices and said method comprising the steps of:
   Receiving said poll command by said first communication device;
   For each of said plurality of NFC devices, deciding if a response should be sent and if so, sending, for each of the plurality of NFC devices for which it is decided that a response should be sent, a response to said second communication device containing information related to one of the plurality of NFC devices for which it is decided that a response should be sent,
   wherein the steps of deciding and sending a response are performed by contactless front-ends of each of said plurality of NFC devices,
   wherein at least two different responses are sent to the second communication device, via the first communication device, by at least two NFC devices of the plurality of NFC devices, and
   wherein the contactless front-ends of each of said plurality of NFC devices each determine its own identifier by randomly generating a portion of the identifier, wherein the identifier is included in the information related to the one of the plurality of NFC devices for which it is decided that the response should be sent and the identifier is included in the response.

2. The method according to claim 1, wherein said poll command is forwarded to each of said plurality of NFC devices.

3. The method according to claim 1, wherein the identifier is a NFCID2 identifier.

4. The method according to claim 1, wherein said information contains an indication about whether said one of the plurality of NFC devices for which it is decided that a response should be sent is a Type 3 tag or a peer-to-peer device based NFC-DEP protocol.

5. The method according to claim 1, wherein the first communication device emulates a second plurality of NFC devices, the method further comprising:
   deciding, by the first communication device, whether a response to the poll command should be sent for one or more of the second plurality of NFC devices; and
   sending, by the first communication device, the response to the poll command when it is determined that a response should be sent for one or more of the second plurality of NFC devices.

6. The method according to claim 5, wherein when it is decided that a response to the poll command should be sent for at least two of the second plurality of NFC devices, the first communication device sends at least two different responses to the second communication device.

7. The method according to claim 1, wherein when the at least two different responses collide by attempting to send the response in a same slot that is randomly selected by the at least two NFC devices, the first communication device resets the randomly selected slots and triggers generation of another random slot number for each of the at least two NFC devices to send the response.

8. A non-transitory computer readable medium, having thereon a computer program comprising program instructions, wherein execution of the computer program by a data-processing unit of a first communication device causes the data-processing unit to:
   receive a poll command by said first communication device from a second communication device, wherein the first communication device is in listen mode and the first communication device emulates a plurality of NFC devices;

for each of said plurality of NFC devices, deciding if a response should be sent and if so, sending, for each of the plurality of NFC devices for which it is decided that a response should be sent, a response to said second communication device, containing information related to one of the plurality of NFC devices for which it is decided that a response should be sent, wherein the deciding and sending a response are performed by contactless front-ends of each of said plurality of NFC devices, wherein at least two different responses are sent to the second communication device, via the first communication device, by at least two NFC devices of the plurality of NFC devices, and wherein the contactless front-ends of each of said plurality of NFC devices each determine its own identifier by randomly generating a portion of the identifier, wherein the identifier is included in the information related to the one of the plurality of NFC devices for which it is decided that a response should be sent and the identifier is included in the response.

9. The non-transitory computer readable medium according to claim 8, wherein the first communication device emulates a second plurality of NFC devices, the method further comprising:

deciding, by the data-processing unit, whether a response to the poll command should be sent for one or more of the second plurality of NFC devices; and sending, by the data-processing unit, the response to the poll command when it is determined that a response should be sent for one or more of the second plurality of NFC devices.

10. The non-transitory computer readable medium according to claim 9, wherein when it is decided that a response to the poll command should be sent for at least two of the second plurality of NFC devices, the first communication device sends at least two different responses to the second communication device.

11. The non-transitory computer readable medium according to claim 8, wherein when the at least two different responses collide by attempting to send the response in a same slot that is randomly selected by the at least two NFC devices, the first communication device resets the randomly selected slots and triggers generation of another random slot number for each of the at least two NFC devices to send the response.

12. A first communication device comprising:
an antenna and physical circuitry for receiving a poll command from a second communication device
a plurality of entities emulating NFC devices,
an arrangement for deciding, for each entity of said plurality of entities, if a response should be sent and if so sending, for each of the plurality of NFC devices for which it is decided that a response should be sent, a response to said second communication device, containing information related to one of the plurality of NFC emulated devices for which it is decided that a response should be sent, wherein each of said plurality of entities emulating NFC devices comprises contactless front-ends including answering arrangements adapted to elaborate and send a response to the second communication device via the antenna of the first communication device, the response is related to the one of the plurality of emulated NFC devices for which it is decided that a response should be sent, and the contactless front-ends of each of said plurality of entities each determine its own identifier by randomly generating a portion of the identifier, wherein the identifier is included in the information related to the one of the plurality of emulated NFC devices for which it is decided that the response should be sent and the identifier is included in the response.

13. The first communication device according to claim 12, wherein the identifier is a NFCID2 identifier.

14. The first communication device according to claim 12, wherein said information contains an indication about whether said one of the plurality of emulated NFC devices for which it is decided that a response should be sent is a Type 3 tag or a peer-to-peer device based NFC-DEP protocol.

15. A system comprising the first communication device according to claim 12 and said second communication device.

16. The first communication device according to claim 12, further comprising:
a second plurality of entities emulating NFC devices;
a communication device answering arrangement that
decides whether a response to the poll command should be sent for one or more of the second plurality of NFC devices; and
sends the response to the poll command when it is determined that a response should be sent for one or more of the second plurality of NFC devices.

17. The first communication device according to claim 16, wherein when it is decided that a response to the poll command should be sent for at least two of the second plurality of NFC devices, the communication device answering arrangement sends at least two different responses to the second communication device.

18. The first communication device according to claim 12, wherein when the at least two different responses collide by attempting to send the response in a same slot that is randomly selected by the at least two NFC devices, the communication device resets the randomly selected slots and triggers generation of another random slot number for each of the at least two entities to send the response.

* * * * *